Oct. 10, 1933.  A. B. CASPER  1,929,807
DRAG LINK
Filed Aug. 8, 1931
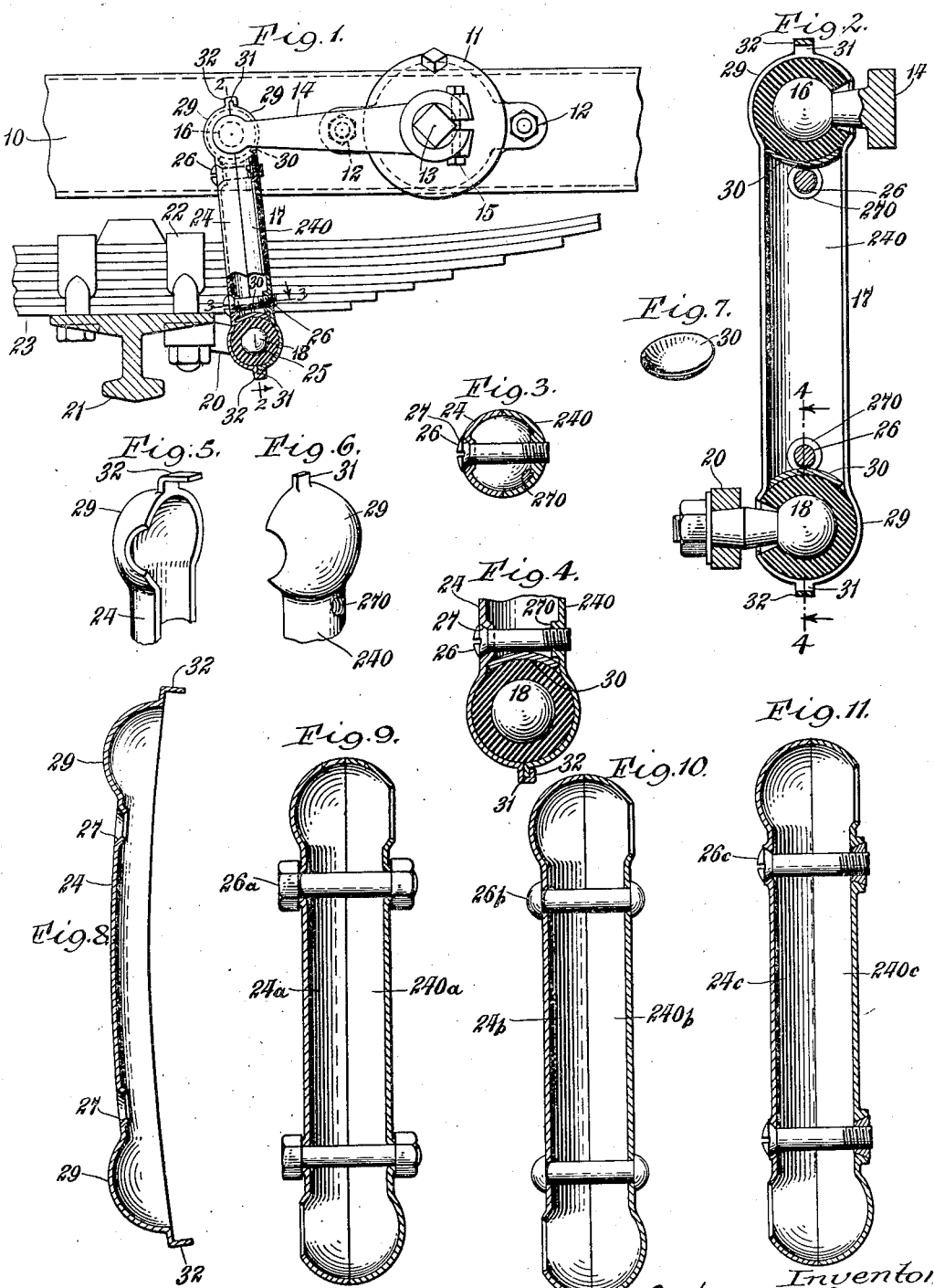
Inventor
Anthony B. Casper
by Popp & Powers
Attorneys Patented Oct. 10, 1933

1,929,807

UNITED STATES PATENT OFFICE 1,929,807

DRAG LINK

Anthony B. Casper, Buffalo, N. Y., assignor to Houde Engineering Corporation, Buffalo, N. Y., a corporation of New York Application August 8, 1931. Serial No. 555,935

9 Claims. (Cl. 74—17)

This invention relates to a link for connecting two members which move relatively to each other, and particularly relates to a drag link having rubber-bearing ball and socket joints for connecting the axle of an automobile with the arm of the shock absorber which is mounted on the frame of said automobile.

One of the objects of the invention is to provide a split drag link on which an initial strain is put into those parts of said link which should be able to bear rapid and heavy loads without undue flexure, and without opening up the seams. Another object of the invention is to provide a drag link which may be easily disassembled for replacement of any of its component parts. A further object of the invention is to provide a drag link which may be made in an inexpensive production basis from stamped sheet metal with a full use of all of the possibilities of this material. Numerous other objects of the invention and practical solutions thereof are disclosed in detail in the herein patent specification wherein:

In the accompanying drawing:

Figure 1 is a fragmentary side elevation of one corner of an automobile showing the improved drag link connecting the shock absorber arm with the axle of the automobile.

Figure 2 is an enlarged, longitudinal, medial section through said drag link and its associated parts, taken on line 2—2, Fig. 1.

Figure 3 is a cross section through said drag link taken on line 3—3, Fig. 1.

Figure 4 is a longitudinal, medial section through the lower end of said drag link taken on line 4—4, Fig. 2.

Figures 5 and 6 are fragmentary, perspectives of the upper ends of the shell sections which principally constitute the drag link.

Figure 7 is a perspective of the bridging disk.

Figure 8 is a longitudinal, medial section through one of said shell sections.

Figures 9, 10 and 11 are longitudinal, medial sections through modified forms of the invention.

In the following description, similar characters of reference indicate like parts in the several figures of the drawing.

My invention may be embodied in various forms and in drag links of different constructions, and the present applications are therefore to be regarded merely as a small number of the possible organizations which come within the scope of my invention and satisfactorily carry out the function of same in practice. As here shown, and referring for the present to only Figs. 1-8, the same is constructed as follows:

To the channel bar or main side frame bar 10 of an automobile chassis is secured a dual wing type, or other suitable form, of hydraulic shock absorber 11 by means of bolts 12 which connect the ears of said shock absorber with the web of said channel bar 10. Rotatably mounted in said shock absorber 11 is a rock shaft 13 to which is secured an actuating lever 14, the larger or inner end of which is preferably split to secure a firm connection and is clamped to said shock absorber rock shaft 13 by means of a clamp bolt 15, while its smaller or outer end is integrally provided with a spherical upper pivot head 16 which projects laterally a short distance from said actuating lever 14. This upper pivot head 16 constitutes the male element of a ball and socket joint which serves to connect the outer end of said actuating lever 14 with the upper end of my improved drag link 17.

A similar lower spherical pivot head 18 is received within the lower end of said drag link 17 to form a ball and socket joint which connects said drag link with a bracket 20, the latter being secured to the automobile axle 21 by the usual U-shaped spring clip bolt 22 which, incidentally, also serves in the usual and well known manner, to secure said axle to the central or thick portion of the multiple leaf automobile spring 23.

It is the construction of this drag link 17, together with the ball and socket joints at its opposite ends, which constitutes the essence of the herein invention, and this drag link will now be described in detail.

The main body of the drag link is made up of a pair of shell sections 24 and 240, each of which is provided at its opposite ends with a semi-spherical socket 29 which is formed coaxially with the semi-spherical socket 29 of its companion shell section so as to form the spherical female element or socket of a ball and socket joint. Arranged within each spherical socket is a hollow resilient sleeve 25 into the hollow interior of which projects the spherical pivot head 16 or 18 as the case may be, said pivot heads being secured, integrally or otherwise, with the parts which are movable relatively to each other, and which are connected together by the drag link, which is the subject of the present invention.

In the construction of Figs. 1—8, the said pair of shell sections 24, 240 are connected together by oval headed machine screws 26. The head of each of said screws is received within the conical bore of a perforated annular conical flange 27 so as to be substantially flush; the character of the material from which both shell sections are made (namely stamped sheet metal) lending itself most advantageously to such an arrangement. Similarly the shell section 240 is provided with an annular flange 270 which is internally threaded so as to engage with the external screw thread of its companion machine screw 26, so that when the latter is tightened up with a screw driver, the two shell sections 24, 240 are drawn tightly together.

As will be noted from Fig. 8, each shell section 24, 240 is considerably bowed longitudinally prior to assembly. The result of this construction is that an initial force is imposed upon the outer ends of said shell sections, i.e., at their semi-spherical sockets 29, so that the pairs of companion sockets 29 cannot be sprung or spread apart until the acting pressure has at least reached a point when it is greater than the initial force which is holding the same together due to the bowed shape of each shell section prior to its assembly. Such a construction is much superior to one in which said shell sections are not bowed inasmuch as in such a case the slightest active load would cause the semi-spherical sockets to be sprung apart, the deflection or opening up of said sockets being directly proportional to the force which is acting. Such is not the case in the present invention, no deflection at all being possible until a certain maximum force has been applied, and it is, of course, to be assumed that this maximum resisting force is greater than any force to which the drag link will actually be subjected, the result being that, in practice, no deflection or opening up of the ends of the drag link occurs.

It is to be understood that, before thus securing said shell sections together by said machine screws 26, the hollow spherical resilient sleeves 25 are first sprung over their companion pivot heads 16 and 18 and the cupped sheet metal disks 30 placed in the position shown, the latter serving to prevent their companion resilient sleeves 25 from extruding into the cylindrical bore of the drag link.

Subsequently to the securing together of said shell sections 24, 240 by means of the machine screws 26, additional securing means are provided to hold together said shell sections at the particular point where the greatest bursting strains are encountered, namely, at their outer ends at their semi-spherical sockets 29. This additional securing means comprises a prong 31 (see Figs. 6, 4, 1 and 2) formed at each end of the one shell section 240 and projecting integrally, longitudinally and outwardly therefrom. The other shell section 24 is provided with a strengthening finger 32 which, prior to the assembling of the drag link, is of L shape as shown in Fig. 8. After the two shell sections 24, 240 have been placed together and the machine screws 26 screwed home, the strengthening finger just referred to is bent over the end of the prong 31 to the position of Fig. 1, thereby additionally securing together the extreme outer ends of said shell sections 24, 240.

One modification of the invention is shown in Fig. 9. In this case bolts 26a replace the machine screws 26 of Figs. 1—8, and the prongs 31 and strengthening fingers 32 are omitted. It is to be understood, however, that the two shell sections 24a, 240a are, prior to assembly, of bowed or arcuate shape similar to that shown in Fig. 8.

In Fig. 10 is shown a modification which is similar to the construction of Fig. 9 except that rivets 26b replace the bolts 26a to secure together the two shell sections 24b, 240b.

In Fig. 11 is shown another modification similar to that of Fig. 9 except that machine screws 26c replace the bolts 26a in securing together the shell sections 24c, 240c.

I claim:

1. A drag link connected at its opposite ends with members which move relatively to each other and comprising a pair of shell sections which, prior to their complete assembly, are in contact with each other at their end portions and are arcuately bowed from each other intermediate their end portions; and securing means for bringing together the intermediate parts of said shell sections and forcibly holding the end portions together.

2. A drag link connected at its opposite ends with members which move relatively to each other and comprising a pair of shell sections which, prior to their complete assembly, contact each other at their end portions and are bowed from each other intermediate the end portions and include stamped and perforated annular flanges; and securing means extending through and bearing against said annular flanges for drawing together the intermediate parts of said shell sections and forcibly pressing the end portions together.

3. A drag link connected at its opposite ends with members which move relatively to each other and comprising a pair of shell sections which, prior to their complete assembly, are bowed so that their middle portions are spaced from each other, and securing means for securing said shell sections together and concomitantly straightening the bowed shape of said shell sections.

4. A drag link connected at its opposite ends with members which move relatively to each other and comprising a pair of shell sections preformed in a gradual substantially arcuate bow and provided at opposite ends with semi-spherical sockets, such that prior to complete assembly with the end portions of the shell sections in contact, the middle portions of the shell sections are bowed from each other, and means for securing said shell sections together intermediate their ends to thereby straighten the bow and force the ends more tightly together.

5. A drag link connected at its opposite ends with members which move relatively to each other and comprising a shell section having a prong, a companion shell section having a strengthening finger which engages with said prong, and securing means for holding said shell sections together, said shell sections having their end portions bent toward each other so that said securing means acts against a resilient force inherently caused by the form of said shell sections so as to press the end portions of the sections more firmly together.

6. A drag link connected at its opposite ends with members which move relatively to each other and comprising a shell section having a prong, a companion shell section having a strengthening finger which is bent over said prong, and securing means for holding said shell sections together, said shell sections having their end portions bent toward each other so that said securing means acts against a resilient force inherently caused by the form of said shell sections so as to press the end portions of the sections more firmly together.

7. A link comprising two mated shells which, prior to complete assembly, are in contact with each other at their end portions and are bowed apart between the end portions, and clamping means for drawing the intermediate portions together and forcing the end portions tighter together.

8. A link comprising two mated shell sections having socket forming end portions for receiving relatively movable members, said shell sections, prior to complete assembly, being in contact with each other at their end portions and bowed apart between the end portions, and clamping means for drawing the intermediate portions together and forcing the end portions tighter together.

9. A drag link comprising a pair of shell sections having mated recessed portions at their ends for receiving relatively movable members, said shell sections being initially preformed so that when placed together their end portions contact each other first with their mid portions arcuately bowed from each other, and means for drawing the mid portions together to thereby exert a relatively great force on the end portions.

ANTHONY B. CASPER.